(12) United States Patent
Weber et al.

(10) Patent No.: US 9,041,885 B2
(45) Date of Patent: May 26, 2015

(54) DISPLAY DEVICE AND METHOD OF LC PANEL PROTECTION

(75) Inventors: Michael F. Weber, Shoreview, MN (US); Yufeng Liu, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 94 days.

(21) Appl. No.: 13/698,746

(22) PCT Filed: Jun. 1, 2011

(86) PCT No.: PCT/US2011/038683
§ 371 (c)(1),
(2), (4) Date: Nov. 19, 2012

(87) PCT Pub. No.: WO2011/156183
PCT Pub. Date: Dec. 15, 2011

(65) Prior Publication Data
US 2013/0070190 A1    Mar. 21, 2013

Related U.S. Application Data

(60) Provisional application No. 61/353,498, filed on Jun. 10, 2010.

(51) Int. Cl.
*G02F 1/1335*  (2006.01)
*G02B 1/04*  (2006.01)
*G02F 1/1333*  (2006.01)

(52) U.S. Cl.
CPC ............ *G02F 1/133553* (2013.01); *G02B 1/04* (2013.01); *G02F 1/133308* (2013.01);
(Continued)

(58) Field of Classification Search
CPC ...... G02B 1/105; G02B 6/005; G02B 6/0055; G02B 5/0278; G02B 5/00; G02B 5/281; G02B 5/282; G02B 5/283; G02B 5/285; G02B 5/287; G02F 1/133504; G02F 1/157; G02F 1/133553; G02F 1/133606; G02F 2203/11; G02F 1/133502; G02F 1/133509; G02F 1/133512; G02F 1/133536; G02F 1/133555; B32B 7/02; B32B 2551/00; B29D 11/0073; B29L 2011/00
USPC .................. 349/193, 112, 187, 113, 114, 96; 427/162, 331; 250/461.1, 504 R
See application file for complete search history.

(56) References Cited

U.S. PATENT DOCUMENTS

| RE27,617 E | 4/1973 | Olsen |
| 5,204,160 A | 4/1993 | Rouser |

(Continued)

FOREIGN PATENT DOCUMENTS

| CA | 2098833 | 2/2002 |
| WO | WO 97/01778 A1 | 1/1997 |

(Continued)

OTHER PUBLICATIONS

U.S. Appl. No. 61/353,498 to Weber et al., filed Jun. 10, 2010, entitled *Display Device and Method of LC Panel Protection*.
(Continued)

*Primary Examiner* — Thoi Duong
(74) *Attorney, Agent, or Firm* — Daniel J. Iden

(57) ABSTRACT

A display device uses a multilayer film (104), which reflects (red) light having wavelengths between about 600 and 800 nm at a 60 degree angle of incidence (114), to protect a liquid crystal panel (102) from heat and sun damage. The film (104) transmits light of the visible band with a wavelength between about 420 and 650 nm at normal incidence (116). The outermost surface (106) of the film (104) may be a hard coat (124). A metal oxide layer (120) and a metal layer (130) may be included to reflect IR light greater in wavelength than about 850 nm.

16 Claims, 3 Drawing Sheets

(52) U.S. Cl.
CPC . *G02F2001/133331* (2013.01); *G02F 2203/02* (2013.01); *G02F 2203/055* (2013.01); *G02F 2203/11* (2013.01)

(56) References Cited

U.S. PATENT DOCUMENTS

| | | | |
|---|---|---|---|
| 5,254,388 | A | 10/1993 | Melby et al. |
| 5,825,436 | A | 10/1998 | Knight |
| 5,882,774 | A | 3/1999 | Jonza |
| 6,049,419 | A * | 4/2000 | Wheatley et al. ............ 359/359 |
| 6,211,934 | B1 | 4/2001 | Habing |
| 6,368,699 | B1 | 4/2002 | Gilbert |
| 6,398,370 | B1 | 6/2002 | Chin |
| 6,531,230 | B1 | 3/2003 | Weber |
| 6,783,349 | B2 | 8/2004 | Neavin |
| 6,797,366 | B2 | 9/2004 | Hanson |
| 6,896,960 | B2 | 5/2005 | Shoshi et al. |
| 7,018,713 | B2 | 3/2006 | Padiyath |
| 7,094,461 | B2 | 8/2006 | Ruff |
| 7,138,173 | B2 | 11/2006 | Wheatley |
| 7,140,741 | B2 | 11/2006 | Fleming |
| 7,256,936 | B2 | 8/2007 | Hebrink |
| 7,486,019 | B2 | 2/2009 | Padiyath |
| 7,709,092 | B2 * | 5/2010 | Qiu et al. .................... 428/422 |
| 2002/0112384 | A1 | 8/2002 | Huang et al. |
| 2007/0160811 | A1 | 7/2007 | Gaides |
| 2008/0088939 | A1 | 4/2008 | Jung |
| 2008/0186558 | A1 | 8/2008 | Lee |
| 2009/0286098 | A1 * | 11/2009 | Yajima et al. ................. 428/507 |
| 2009/0323180 | A1 | 12/2009 | Weber |
| 2010/0201242 | A1 | 8/2010 | Liu |

FOREIGN PATENT DOCUMENTS

| | | |
|---|---|---|
| WO | WO 02/061469 A2 | 8/2002 |
| WO | WO 2007/100458 | 9/2007 |
| WO | WO 2007/118122 | 10/2007 |
| WO | WO 2008/085889 | 7/2008 |
| WO | WO 2008/088939 A1 | 7/2008 |
| WO | WO 2008/144636 | 11/2008 |
| WO | WO 2008/144644 | 11/2008 |
| WO | WO 2009/085581 | 7/2009 |
| WO | WO 2010/090924 A2 | 8/2010 |
| WO | WO 2010/148082 | 12/2010 |

OTHER PUBLICATIONS

International Application No. PCT/US2011/038683 Search Report dated Aug. 1, 2012.
International Application No. PCT/US2011/038683 Written Opinion of the International Searching Authority dated Aug. 1, 2012.
Comparative A , "3M Gold Privacy Filter", has been commercially available for more than 1 year.

* cited by examiner

DISPLAY DEVICE AND METHOD OF LC PANEL PROTECTION

FIELD OF THE INVENTION

The present description relates to display devices. The present description also relates to methods of protecting an LC panel from heat and sun damage.

BACKGROUND

Liquid crystal display panels have rapidly become one of the most popular types of panels used in a variety of displays, including cell phones, PDAs (personal digital assistants), computer monitors, laptop displays, televisions, and advertising displays amongst others. In a number of cases, it is desirable for an LC display panel to be used outdoor in the sunlight. However, exposure of an LC display panel to sunlight without protection creates serious risk of thermal overload to the panel and vastly reduced lifetime of the display.

In an effort to reduce thermal damage to LC display panels, infrared light blocking films have been applied over LC panels. However, LCD panels absorb mostly in the 400 to 850 nm region of the spectrum with lower absorption at longer wavelengths. Therefore, infrared light blocking films allow some of the most thermally damaging light to pass on to the LC panel. Another approach contemplated is to apply a reflective polarizer to the surface of the LC display panel. However, such an approach undesirably blocks transmission at all angle. Thus, for outdoor viewing in the sunlight, a viewer on-axis will likely only be able to see him or herself and not the display. Applying a matte surface to the LC panel is equally ineffective because this causes very low display contrast due to the bright front surface and may not allow viewing of the image.

For outdoor displays in which an on-axis viewing is contemplated, it would be desirable to have a coating or film applied to the liquid crystal panel that would block a wide spectrum of visible light (as well as infrared light) at off-axis angles, while transmitting a good deal of visible light at on-axis angles, while still blocking both some visible light and infrared light.

One recent invention by 3M Co., disclosed in commonly assigned U.S. patent application Ser. No. 12/696,484 provides for a multilayer optical film positioned on top of a light control privacy film. This invention provides for good off-axis blockage of the light, but also provides for some absorption of light by the light control film absorptive regions on-axis. The invention also does not contemplate utilizing materials for continual use in an outdoor setting. Materials used in continual exposure to direct sunlight often experience UV damage and subsequently perform insufficiently.

It would therefore be desirable to have a display application that could control the sun and heat damage to the LC display panel by blocking a majority of off-axis light, both visible and infrared, and also blocking a portion of on-axis light in the infrared and visible spectrum, while still transmitting a large amount of visible light through at a normal viewing angle to allow for a visible, high contrast image. It would also be desirable if this coating were made up of such materials so as to be capable of the contemplated outdoor use in direct sunlight for extended periods of time. The present description seeks to provide a solution to these needs.

SUMMARY

In one aspect, the present description relates to a display device. The display device includes a liquid crystal panel, and a multilayer optical film located between the liquid crystal and an intended viewer, such that light incident upon the display device is first incident upon the multilayer optical film. The multilayer optical film is made in part of a UV stable material, so that the film is capable of outdoor use. The film is further characterized by transmitting over 60% of short range visible band of light at a 60 degree angle of incidence through to the liquid crystal panel, reflecting a majority of a large LC destructive band of light at a 60 degree angle of incidence, and transmitting through to the liquid crystal panel over 70% of light of a long range visible band of light at normal incidence.

In another aspect, the present description relates to a method for reducing sun damage to a liquid crystal panel. The method includes applying a multilayer optical film to the liquid crystal panel that reflects or absorbs a majority of light having a wavelength of between about 600 nm and about 800 nm at a 60 degree angle of incidence, transmits over 70% of light having a wavelength of between about 420 nm and about 650 nm at normal incidence through to the liquid crystal panel at a 60 degree angle of incidence, and transmits over 70% of light having a wavelength of between about 420 nm and about 650 nm from the input surface through to the liquid crystal panel at normal incidence.

In a third aspect, the present description relates to a method for controlling heat on a liquid crystal panel. The method includes applying a multilayer optical film to the liquid crystal panel that reflects or absorbs a majority of light having a wavelength of between about 600 nm and about 800 nm at a 60 degree angle of incidence, transmits over 70% of light having a wavelength of between about 420 nm and about 650 nm at normal incidence through to the liquid crystal panel at a 60 degree angle of incidence, and transmits over 70% of light having a wavelength of between about 420 nm and about 650 nm from the input surface through to the liquid crystal panel at normal incidence.

In a final aspect, the present description relates to a display device. The display device includes a liquid crystal panel, a multilayer polymeric film optically coupled to the LC panel, a metal layer optically coupled to the multilayer polymeric film and display device, and at least one metal oxide layer disposed on a surface of the metal layer. A majority of light with a wavelength of between about 420 nm and 650 nm incident upon the multilayer film at normal is transmitted, and a majority of light having a wavelength of between about 420 nm and about 550 nm incident upon the multilayer film at a 60 degree angle of incidence is reflected. A majority of light having a wavelength about 600 nm to about 800 nm is reflected at a 60 degree angle of incidence.

DETAILED DESCRIPTION

LC panels that are used outdoors are at great risk of damage to both performance and life-span due to the high amount of heat that is absorbed by the panels from incident light. The portion of the visible spectrum that generates the most heat on the LC panel is from about 400 to about 850 nm. Unfortunately, a great deal of this wavelength range is visible light. Therefore, blocking the light from this portion of the spectrum completely will result in no viewable image on the LC panel from any angle. The present invention seeks to provide a solution to the heating problem on LC panels by providing a film over the LC panel that blocks a great deal of damaging light at off-axis angles, e.g., 60 degrees, and allows more light transmission at normal incidence. The film also seeks to block at least a portion of the damaging light in the visible spectrum and infrared spectrum at normal incidence, thus maximizing heat control on the panel, while allowing on-axis visibility.

Figure 1:
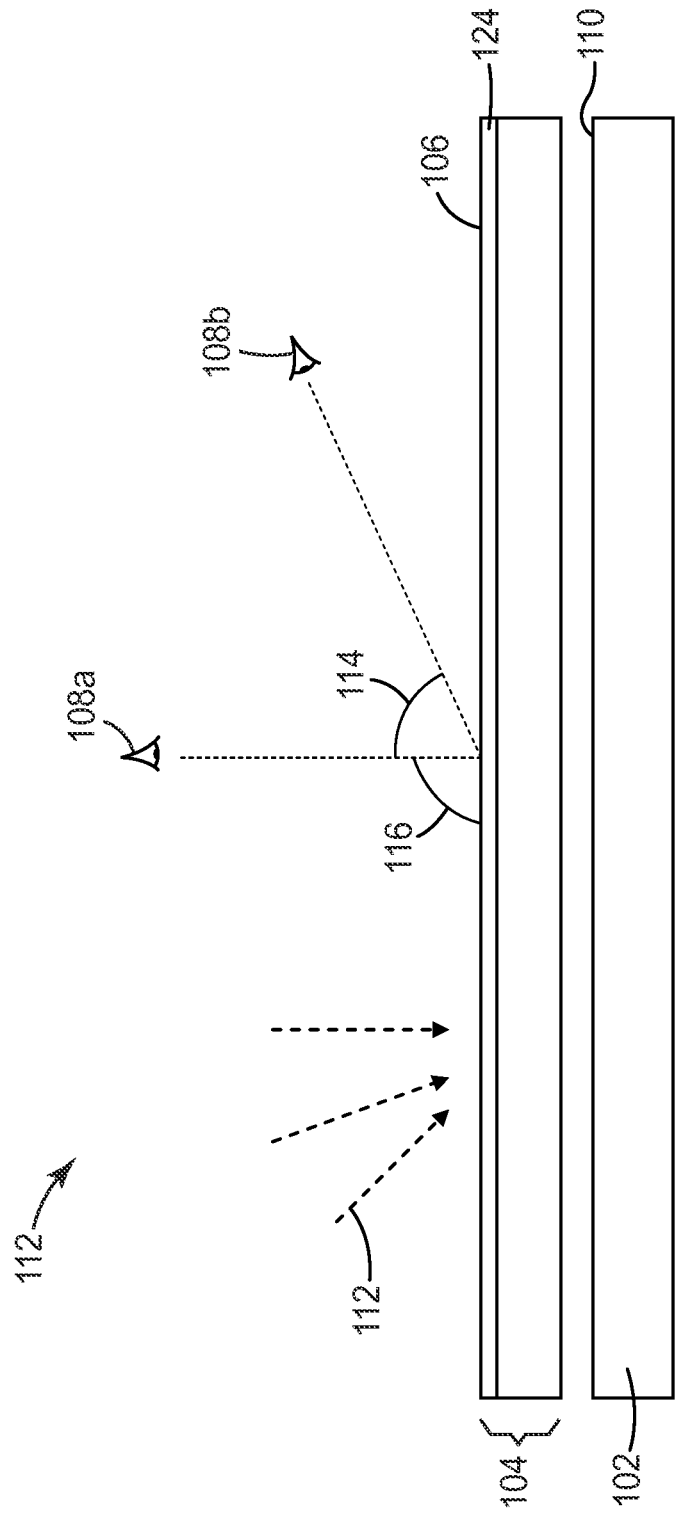
FIG. 1 is a simplified cross-sectional view of a display device.

One embodiment of the current description is illustrated in FIG. 1. The display device in a number of embodiments may be understood as being an "outdoor display device" intended for continuous use in direct sunlight. The display device 100 of FIG. 1 includes a liquid crystal panel 102. The liquid crystal panel may be understood as having a viewing side 110 that is most proximate the viewer 108a, 108b of the image. Stacked between the viewer 108a, 108b and the liquid crystal panel 102 is a multilayer optical film 104. The multilayer optical film has a surface 106 that may be understood as the outermost surface of the display device, or, on a smaller scale, as the outermost surface of the film. In order to most effectively shield the liquid crystal panel 102 from incident sunlight 112 the multilayer optical film 104 has different light blocking properties at different wavelengths for light that is incident at a 60 degree angle 114 (where the angle is measured from an axis at normal to the multilayer optical film plane and liquid crystal panel plane), and light that is incident at normal 116. Specifically, a great deal of light in the visible, as well as infrared should be blocked at the 60 degree angle 114, such that viewer 108b can see little to no image on the panel 102. However, viewer 108a at normal angle 116 will be able to see a fairly high brightness image, while the film continues to block part of the visible spectrum and the infrared spectrum for heat control. The multilayer optical film should be understood as located between the liquid crystal panel 104 and an intended viewer, where an intended viewer could be located at viewer position 108a or 108b, for example.

At least a portion of light that is emitted from the liquid crystal pane 102 is transmitted through the multilayer optical film 104, and at least a portion of incident light 112, in the case of the current description, primary sunlight, is transmitted through the multilayer optical film 104 to the liquid crystal panel 102. By this understanding, the liquid crystal panel and multilayer optical film may be understood as being "optically coupled."

In order to most effectively control heat absorption and damage to the liquid crystal panel, the multilayer optical film 104 reflects, or in some cases, reflects or absorbs, a majority of the incident light 112, generally sunlight. For performance assessment, it is valuable to measure the amount of reflection that occurs for light incident upon the multilayer optical film at a 60 degree angle of incidence. The band that is reflected at this angle is generally a large band, and contains a large amount of the light that is destructive of an LC panel. It may therefore be referred to as a "large LC destructive band." The LC destructive band may have different values, as described herein. For instance, the LC destructive band may be between about 600 nm and about 800 nm. Alternatively, the LC destructive band may be between about 570 nm and about 900 nm. In one embodiment, at 60 degree angle, the film reflects an average of a majority of light having a wavelength having a wavelength between about 600 nm and about 800 nm. In another embodiment, the film reflects an average of at least 75% of light having a wavelength of between about 600 nm and about 800 nm. In another embodiment, the film reflects an average of at least about 90% of light having a wavelength of between about 600 nm and about 800 nm at a 60 degree angle of incidence. In another embodiment the multilayer optical film reflects an average of at least about 95% of light having a wavelength of between about 600 nm and about 800 nm at this same angle of incidence In another embodiment the multilayer optical film reflects an average of at least about 75% of light having a wavelength of between about 570 nm and about 900 nm at a 60 degree angle of incidence. In yet another embodiment, the multilayer optical film reflects an average of at least about 90% of light having a wavelength of between about 570 nm and about 900 nm at this same 60 degree angle. In a final embodiment for light incident upon the multilayer optical film at a 60 degree angle, the multilayer optical film reflects an average of at least about 97% of light having a wavelength of between about 570 nm and about 900 nm.

In other embodiments, again with light incident upon the multilayer optical film at a 60 degree angle of incidence (from normal to the film), the multilayer optical film, not only reflects, but reflects or absorbs at least a majority of light having a wavelength of between about 600 nm and about 800 nm, or reflects or absorbs an average of at least about 75% of light having a wavelength of between about 600 and about 800 nm, or reflects or absorbs at least about 90% of light having a wavelength of between about 600 nm and 800 nm, or reflects or absorbs at least about 95% of light having a wavelength of between about 600 nm and 800 nm, all at a 60 degree angle of incidence. In other embodiments, at a 60 degree angle of incidence, the multilayer optical film reflects or absorbs an average of at least about 75% of light having a wavelength of between about 570 nm and about 900 nm, or reflects or absorbs at least about 90% of light having a wavelength of between about 570 nm and about 900 nm, or reflects or absorbs at least about 97% of light having a wavelength of between about 570 nm and about 900 nm.

At a 60 degree angle of incidence, the multilayer optical film will also transmit a majority of light at some of the lowest wavelengths of the visible spectrum. When referring to "transmission through" the multilayer optical film, it is to be understood, that such transmission means that incident light travels through the multilayer optical film all the way to the liquid crystal panel. Thus, the transmission level or percentage of transmitted light, is actually the amount that is incident at the surface 110 of the liquid crystal panel, and not just the portion that exits the multilayer optical film 104 while traveling towards the liquid crystal panel 102. In other words, no further impediment is encountered by light between the multilayer optical film and liquid crystal panel that in any way lowers transmission below the presently described and claimed levels. In one embodiment the multilayer optical film transmits over 60% of light having a wavelength of between about 420 nm and about 550 nm at a 60 degree angle of incidence. This wavelength range (420 nm to 550 nm) may be defined herein as a "short range visible band." This term is used to contrast the "long range visible band" transmitted at normal (where the long range visible band is 420 nm to 650 nm). In another aspect, the multilayer optical film transmits over 70% of light having a wavelength of between about 420 nm and about 550 nm from a light input surface of the film 106 through to the liquid crystal panel at a 60 degree angle of incidence. In another aspect, the multilayer optical film may simply transmit a majority of light having a wavelength of between about 420 nm and about 550 nm at a 60 degree angle of incidence.

One aspect of the presently described film is its ability at normal incidence to block a significant portion of light in the infrared spectrum as well as a small portion of the visible spectrum, while still allowing enough visible transmission for good on-axis viewing.

At normal incidence, the presently described multilayer optical film may transmit over 70% of light having a wavelength of between about 420 nm and about 650 nm in one embodiment. Again the band of light that is transmitted at the desired transmission levels may be understood, as referenced above, as a "long range visible band" of light. More specifically, 420 nm to 650 nm may be understood as the long range visible band of light. In another aspect, with light having a wavelength of between about 420 nm and about 650 nm, the film may be understood as transmitting a majority of the light. Again, as with the transmission discussed at 60 degree angle of incidence, "transmitted" is to be understood as light passing through the optical film all the way to the surface 110 of the liquid crystal panel at the stated level.

For that portion of the light that is higher wavelength, again, a great deal of light at normal incidence is reflected. In one embodiment, the multilayer optical film reflects an average of at least about 90% of light having a wavelength of between about 690 nm and about 1100 nm at normal incidence.

As described throughout, the multilayer optical film's placement on the liquid crystal panel reduces the heat that is generally absorbed by the liquid crystal panel with direct exposure to the sunlight. The present description is related to displays that are intended for continuous outdoor use, and thus, the management of heat on the liquid crystal panels is crucial. As such, the present description may not be understood as only an apparatus, but also may be understood as a method for reducing sun damage to a liquid crystal panel. The method in question involves applying a multilayer optical film of the properties described above to a liquid crystal panel. In another aspect, the present description may not be understood as only an apparatus, but also as a method for reducing heat on a liquid crystal (LC) panel. The present description therefore also relates to methods of protecting liquid crystal panels during use in the sunlight.

When display devices begin to weather from the effects of heat absorption, one common effect is a fading of the image, and also a yellowing of the display. This increasing yellowing throughout a display's life may be caused by warping under heat, subsequent cracking under stress and UV degradation. In order to better understand how effectively a film is protecting an LC panel from heat, therefore, it is valuable to measure an index of the yellowness of a display device at various points during the display's lifetime.

Yellowness is generally measured by a colorimetry device. The colorimetry device takes chromatic values according to a CIELAB "color space" specified by the International Commission on Illumination (Commission Internationale d'Eclairage). The color space is defined by Lightness (L*), position between red/magenta and green (a*) and position between yellow and blue (b*). The b* value is such that negative values indicate blue, with further negative values being the most blue. Positive values of b* indicate a non-zero value of yellow color, where again higher positive values indicate a more yellow color. More specifically, a b* value of between about −2 and +2 is essentially colorless. A b* value of between about +3 and +5 is slightly yellow. A b* value of over +10 is objectionably yellow for most LCD displays.

The display devices of the current description are intended for continuous outdoor use. They are therefore subjected to a serious threat of yellowing. However, the multilayer optical film serves as protection from sunlight damage, and therefore protection from display yellowing. In fact, the display device may maintain a b* yellowness of less than 5 for at least 5 years. This translates to slightly yellow or less even after 5 years of continual daily sunlight exposure.

The multilayer optical film of the present invention may be understood as a color shifting film. A basic understanding of some of the materials used, as well as the optical properties of these films may be gained by referencing commonly owned U.S. Pat. No. 6,531,230, the contents of which is incorporated by reference in its entirety. However, the multilayer optical films of the current invention also place further limitations on either material choices, or material additives to the films for the purposes of UV-stability. One especially UV-stable material for use in the films of the current description is PET/coPMMA. Additives may also be provided to a PET, or added as an outer layer as discussed further below. Particularly suitable UV-stable additives may include triazines, such as Tinuvin 1577 or UV-1164 (from Cytec Industries, Inc., Woodland Park, N.J.), benzotriazoles, such as Tinuvin 900 or Tinuvin 360 (from Ciba Co, Switzerland, now owned by BASF), benzoxazinones, such as UV-3638 (from Cytec), hindered amine light stabilizers, benzophenones, or a THS, such as UV-6435 (from Cytec).

In some embodiments, the multilayer optical film may be understood as having at least one layer most proximate at the surface most proximate to a viewer 106 (or "outermost surface" of the display device) that serves as a protective layer for the remainder of the film. FIG. 1, for purposes of illustrating this layer, provides this outer layer or coat as element 124. It should be understood, however, that multilayer optical film 104 has a number of other layers not specifically identified by markings on film 104. The outer layer 124 may be understood as a "coat" on the multilayer optical film. However, it also may simply be understood as the outermost layer of the multilayer film. In some embodiments, the coat may serve to protect the display device from damage by external materials and ordinary wear and tear during use. Therefore, the coat may be made in part of a hard material, so that the device is not torn, scratched, or punctured. The material also will desirably be durable, due to the extended outdoor use associated with the device described.

In cases where a hard coat is employed, a particular useful resin may be appropriate, such as a thermoplastic resin. The resin making up a hard coat layer may be formed of a combination of multifunctional (meta)acrylate alone, or may include other well-known reaction compounds. For example, the resin may be formed by reaction of a multifunctional (meta)acrylate-containing-compound having at least one (meta)acryloyl group in one molecule. Here, reaction includes the concept of polymerization, copolymerization, degeneration, and so forth. Preferably, the resin includes multifunctional (meta)acrylate by 80 mol % or more.

Specific examples of multifunctional (meta)acrylate include pentaerythritol tri(meta)acrylate, pentaerythritol tetra(meta)acrylate, dipentaerythritol tri(meta)acrylate, dipentaerythritol tetra(meta)acrylate, dipentaerythritol penta (meta)acrylate, dipentaerythritol hexa(meta)acrylate, trimethylol propane tri(meta)acrylate, n-butyl(meta)acrylate, polyester (meta)acrylate, lauryl(meta)acrylate, hydroxyethyl (meta)acrylate, hydroxypropyl (meta)acrylate, and so forth. With these examples, one or more types of monomer may be mixed.

Though the thickness of the hard coat layer is appropriately selected according to usage, this is commonly 0.5 to 30 µm, and preferably 1 to 8 µm. When the thickness of a hard coat layer is less than 0.5 µm, surface hardness is apt to deteriorate, thereby readily suffering scratches. On the other hand, when the thickness is more than 30 µm, in some cases, cracking may be propagated over the hard coat layer under impact, and accordingly impact strength may be apt to deteriorate. In addition, the hardened film may become fragile, and accordingly, cracking may tend to occur In some embodiments, the outer coat may serve not only for protection from objects against puncturing, scratching, etc., but also from radiation. For example, the outer coat may be understood as further contributing to the heat controlling functionality, and/or to the material stability of the multilayer optical film. With regard to stability, the outer coat may be made of a material that absorbs ultraviolet light, thus shielding the remainder of the multilayer optical film from UV damage. For example, the outer hard coat may absorb at least about 80% of UV light between about 250 nm and about 380 nm, or at least about 90% of light between about 250 nm and about 380 nm, or at least about 95% of light between about 250 nm and about 380 nm, or at least about 98% of light between about 250 nm and about 380 nm.

The coat may also serve other purposes. Preferably, in some embodiments the coat will include an easy-adhesive layer, an adhesive layer, and/or an anti-reflective layer. An anti-reflective layer, for example, may be desirable in order to avoid interfering with the transmission and reflection functionality of the multilayer optical film.

The films and optical devices of the present invention may also be combined with one or more layers of low-emissivity coatings. Such coatings may be selected from metal or metallic oxides that can be applied to one or more surfaces of present invention. These coatings reflect radiant infrared energy, thus tending to keep radiant heat off the solar side of the device from, while letting visible light pass. This can results in more efficient device cooling because radiant heat originating from sun can be reflected off the device screen, keeping it cooler inside. Such coating layers may be made of metals such as silver, gold, copper, aluminum, chromium, nickel, tin, and titanium. Such coating layers may also be made of metal alloys such as silver alloys, stainless steel, amongst others. Further, such coating layers may be made up of semiconductor metal oxides such as doped and undoped tin oxides, zinc oxide, and indium tin oxide (ITO).

As noted, metal and metallic oxide coatings reflect radiant infrared energy. In one embodiment, for example, where both a metal layer and metal oxide layer are present, the layers may reflect a majority of light greater in wavelength than about 850 nm. It should be understood, however, that the reflection and transmission properties contemplated for use of the multilayer optical film in a construction without metal and metal oxide, are also contemplated for constructions that utilize metal and metal oxide. For example, for light of 600 nm to 800 nm wavelength incident on the film at a 60 degree angle, the film may reflect a majority of such light, or 75% of such light, or 90% of such light. The film, at this same angle, may also reflect 90% of light having a wavelength of between about 570 nm and about 900 nm.

When used in conjunction with metal and/or metal oxides, at this same 60 degree angle, the film may transmit a majority of light having wavelengths of between about 420 nm and about 550 nm, or 60% or any other value disclosed above. At normal, the film may transmit a majority of light having a wavelength of between about 420 nm and about 650 nm, or about 60%, or about 70%, or any other appropriate value.

When a metal layer is used in addition to the multilayer optical film, the metal layer will be optically coupled to the multilayer polymeric film and the liquid, which as noted previously, are also optically coupled. Again, "optically coupled" as used herein may be understood as light being emitted from one of the elements, wherein at least some of that light eventually travels through the coupled element.

Figure 2A:
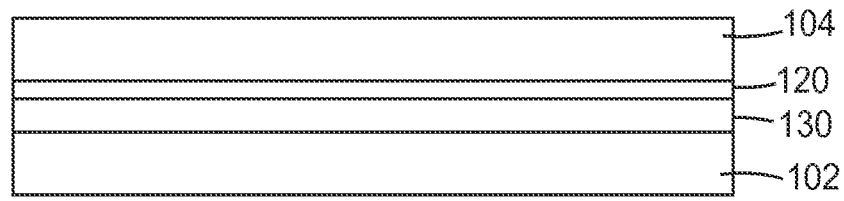
FIGS. 2a-d provide cross-sectional views of display devices.
Figure 2B:
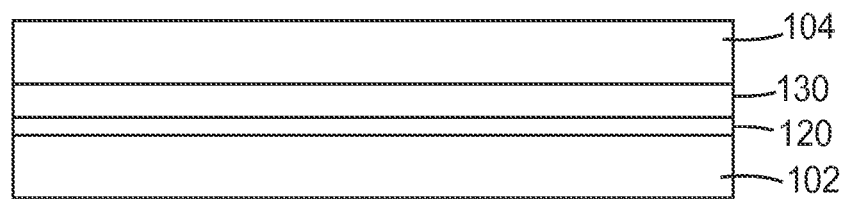
Figure 2C:
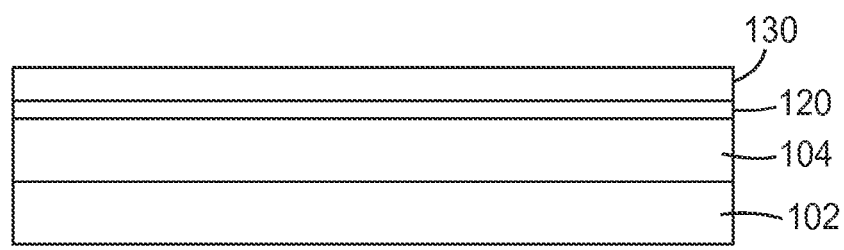
Figure 2D:
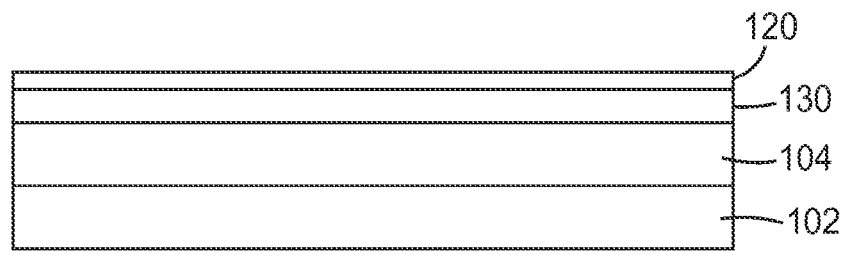

The metal layer may also be accompanied by a metal oxide layer, which is disposed on the surface of the metal layer. The order upon which the liquid crystal panel 102, multilayer optical film 104, metal layer 130, and metal oxide layer 120 stacked may vary as shown in FIGS. 2a, 2b, 2c, and 2d. For example, the multilayer optical film and liquid crystal panel may be separated by the metal layer 130 and metal oxide layer 120, with the metal layer most proximate the liquid crystal panel 102, as shown in FIG. 2a, or with the metal layer most proximate the multilayer optical film, as shown in FIG. 2b. Alternatively, the metal layer 130 and metal oxide layer 120 may be separated from the liquid crystal panel 102 by the multilayer optical film 104, with the metal layer 130 most proximate the viewer and distant from the LC panel, as shown in FIG. 2c, or closer to the LC panel than the metal oxide layer, as shown in FIG. 2d.

Some of the advantages of the disclosed constructions may be illustrated by the following embodiment. In this particular embodiment, the effective transmission and reflection bands of a UV-stable optical film according to the present invention, as well as two films commonly used with, or as part of LCD displays were taken. The commonly used films are especially illustrative of the amount of light in the range of 400 to 850 nm that are absorbed by red, green and blue filters as well as polarizers. Such absorption causes the undesired heating and degradation of LCD panels. Use of the presently described film may therefore provide valuable protection from heating and degradation of the LCD and associated elements.

The first commonly used film was a "green film." The "green film" is a green color filter film that is used to color green pixels in an LCD panel and was supplied by Brewer Science coated onto a microscope slide. The second commonly used film was a polarizer. More specifically, the second film was an absorbing polarizer of the type commonly used in LCD panels. The polarizer was an iodine-dyed polyvinyl alcohol-based type film. The film of the present description utilized was a multilayer optical film with two packets of 223 alternating material layers each. The layers and packets were generated in a feedblock and packet multiplier as described in commonly owned U.S. Pat. No. 6,783,349 to Neavin, et. al. The two alternating layered materials used in the film are a CoPEN (90% PEN, 10% PET) and PMMA.

Figure 3:
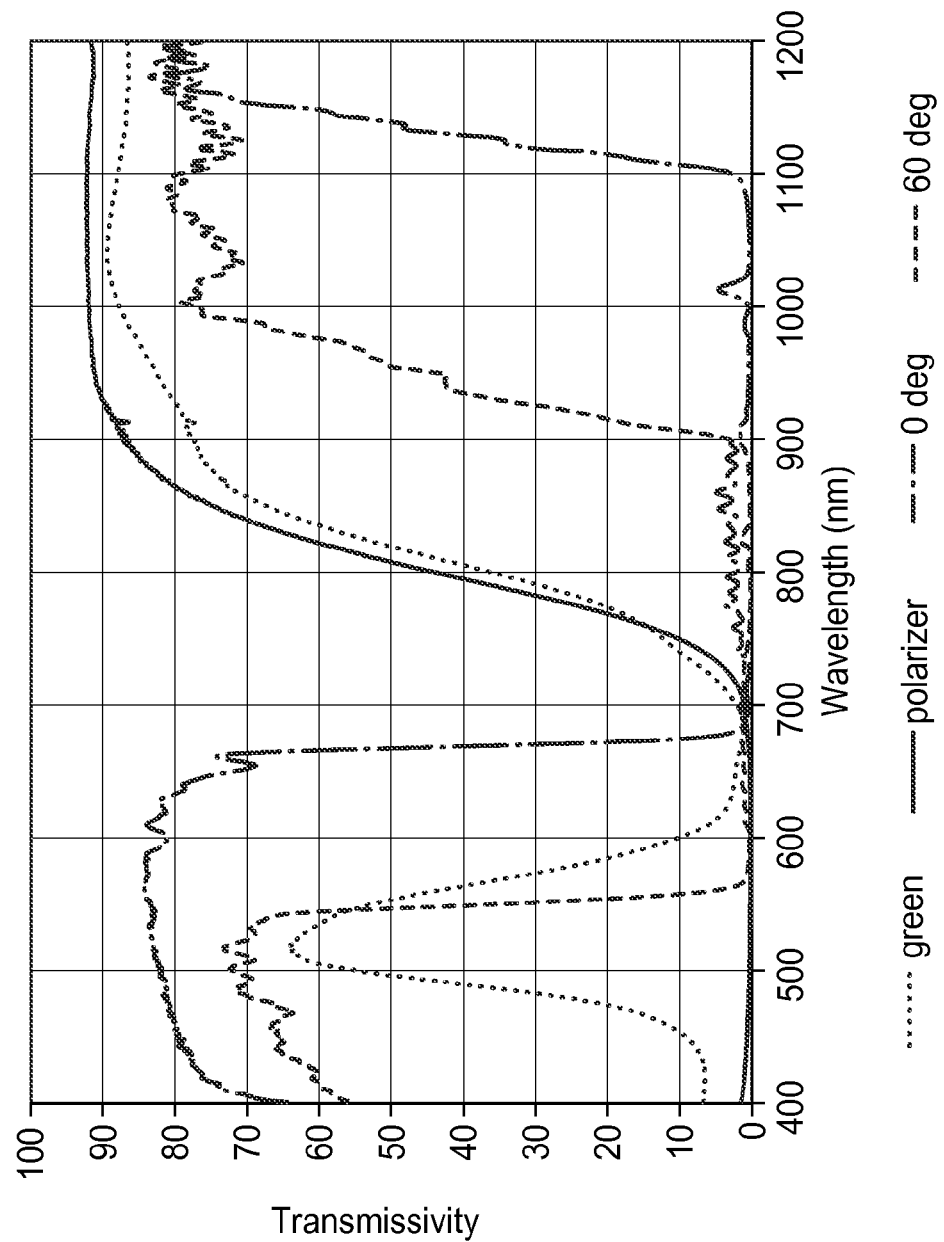
FIG. 3 is a graph of transmissivity of films vs. wavelength of light incident upon the films.

Light was directed through the three films and transmission spectra were measured using a diode array spectrophotometer made by Oriel/Newport. The transmission spectra of the green film and polarizer were each taken at normal to the film (0 degrees), and the currently described multilayer optical film's transmission spectra was measured at 0 degrees and 60 degrees. The resulting transmission spectra are illustrated in FIG. 3. One may easily note that the green film absorbs over 90% of the light between about 600 to 750 nm, which is a large portion of the visible spectrum. The absorbing polarizer absorbed a larger bandwidth of wavelength (over 90% between about 400 nm and about 800 nm). The spectrum shown for the polarizer is only for the block state, but since the front and rear polarizers are crossed, the spectrum in FIG. 3 is representative of the two polarizers in the LCD.

The currently described film displayed highly desirable results for the intended purposes. The multilayer optical film reflected an average of at least about 97% of light having a wavelength of between about 570 nm and about 900 nm at a 60 degree angle. This showed the high amount of blockage, and therefore LCD protection at off-axis solar incidence viewing angles. At 60 degrees, the multilayer optical film transmitted over 60% of light having a wavelength of between about 420 nm and 550 nm. Normal to the film, or at 0 degrees, the multilayer optical film transmitted over 70% (and close to over 75%) of light having a wavelength of between about 420 nm and about 650 nm. The film also served to block high-end visible spectrum light and infrared light at normal. As illustrated in FIG. 3, the multilayer optical film reflected at least about 90% of light having a wavelength of between about 690 nm and about 1100 nm at normal incidence.

We claim:

1. A display device, comprising:
   A liquid crystal panel, and
   A multilayer optical film, the multilayer optical film located between the liquid crystal panel and an intended viewer, such that light incident upon the device is first incident upon the multilayer optical film,
   Wherein the multilayer optical film comprises UV stable material, such that the multilayer optical film is capable of sustainable outdoor use;
   wherein the film transmits over 60% of a short range visible band of light at a 60 degree angle of incidence through to the liquid crystal panel, and the film reflects an average of at least a majority of a large LC destructive band at a 60 degree angle of incidence;
   wherein the large LC destructive band is light of wavelengths between about 600 and 800 nm, and wherein the multilayer optical film reflects an average of at least about 75% of the LC destructive band at a 60 degree angle of incidence;
   And further wherein the film transmits over 70% of a long range visible band of light at normal incidence through to the liquid crystal panel.

2. The display device of claim 1, wherein the short range visible band is light of wavelengths between about 420 nm and about 550 nm.

3. The display device of claim 1, wherein the long range visible band is light of wavelengths between about 420 nm and about 650 nm.

4. The display device of claim 1, wherein the multilayer optical film reflects an average of at least about 95% of the large LC destructive band at a 60 degree angle of incidence.

5. The display device of claim 1, wherein the UV stable material comprises PET/coPMMA.

6. The display device of claim 1, wherein the device maintains a b* yellowness index of less than 5 for at least 5 years.

7. The display device of claim 1, wherein the display device further comprises an outermost surface, the outermost surface comprising a hard coat, wherein the hard coat is anti-reflective, and wherein the hard coat absorbs at least 98% of UV light having a wavelength of between about 250 nm and about 380 nm.

8. A display device, comprising:
   A liquid crystal panel, and
   A multilayer optical film, the multilayer optical film located between the liquid crystal panel and an intended viewer, such that light incident upon the device is first incident upon the multilayer optical film,
   Wherein the multilayer optical film comprises UV stable material, such that the multilayer optical film is capable of sustainable outdoor use;
   wherein the film transmits over 60% of a short range visible band of light at a 60 degree angle of incidence through to the liquid crystal panel, and the film reflects an average of at least a majority of a large LC destructive band at a 60 degree angle of incidence;
   wherein the LC destructive band is light of wavelengths between about 570 nm and about 900 nm, and wherein the multilayer optical film reflects an average of at least about 75% of the LC destructive band at a 60 degree angle of incidence;
   And further wherein the film transmits over 70% of a long range visible band of light at normal incidence through to the liquid crystal panel.

9. The display device of claim 8, wherein the multilayer optical film reflects an average of at least about 97% of the large LC destructive band at a 60 degree angle of incidence.

10. A method for reducing sun damage to a liquid crystal panel, comprising:
    Directly applying a multilayer optical film to the liquid crystal panel that reflects or absorbs a majority of light having a wavelength of between about 600 nm and about 800 nm at a 60 degree angle of incidence, transmits over 70% of light having a wavelength of between about 420 nm and about 550 nm from a light input surface of the film through to the liquid crystal panel at a 60 degree angle of incidence, and transmits over 70% of light having a wavelength of between about 420 nm and about 650 nm from the input surface through to the liquid crystal panel at normal incidence; wherein the multilayer optical film reflects or absorbs at least 75% of light having a wavelength of between about 600 nm and about 800 nm at a 60 degree angle of incidence.

11. The method of claim 10, wherein the multilayer optical film applied to the liquid crystal panel reflects or absorbs an average of at least about 90% of light having a wavelength of between about 570 nm and about 900 nm at a 60 degree angle.

12. A display device, comprising:
    A liquid crystal panel;
    A multilayer polymeric film optically coupled to the liquid crystal panel; and
    A metal layer optically coupled to the multilayer polymeric film and liquid crystal panel; and
    At least one metal oxide layer, the metal oxide layer disposed on a surface of the metal layer;
       Wherein a majority of light having a wavelength of between about 420 nm and about 650 nm that is incident on the multilayer polymeric film at a normal angle is transmitted, and a majority of light having a wavelength of between about 420 nm and about 550 nm that is incident on the multilayer polymeric film at a 60 degree incidence angle is transmitted, and a majority of light having a wavelength between about 600 nm and about 800 nm is reflected at a 60 degree incidence angle; and
       wherein at least 75% of light having a wavelength of between about 600 and 800 nm that is incident on the multilayer polymeric film at a 60 degree incidence angle is reflected.

13. The display device of claim 12, wherein at least 90% of light having a wavelength of between about 570 nm and about 900 nm that is incident on the multilayer polymeric film at a 60 degree incidence angle is reflected.

14. The display device of claim 12, wherein the metal layer and metal oxide layer are positioned between the liquid crystal panel and the multilayer polymeric film.

15. The display device of claim 12, wherein the metal layer and metal oxide layer are positioned on the opposite surface of the multilayer polymeric film from the liquid crystal panel.

16. The display device of claim 12, wherein the outermost surface comprises a hard coat, wherein the hard coat is anti-reflective, and wherein the hard coat absorbs at least 98% of UV light having a wavelength of between about 250 nm to about 380 nm.

* * * * *